(12) United States Patent
Mackey

(10) Patent No.: US 7,263,571 B2
(45) Date of Patent: *Aug. 28, 2007

(54) BUS SEGMENT DECODER

(75) Inventor: Richard P. Mackey, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/418,600

(22) Filed: May 5, 2006

(65) Prior Publication Data

US 2006/0212639 A1  Sep. 21, 2006

Related U.S. Application Data

(63) Continuation of application No. 10/028,881, filed on Dec. 20, 2001, now Pat. No. 7,080,187.

(51) Int. Cl.
*G06F 13/36* (2006.01)
*G06F 13/00* (2006.01)

(52) U.S. Cl. ...................... 710/306; 710/104
(58) Field of Classification Search ............... 710/306, 710/104
See application file for complete search history.

(56) References Cited

U.S. PATENT DOCUMENTS

| | | | |
|---|---|---|---|
| 5,535,340 A * | 7/1996 | Bell et al. | 710/112 |
| 5,568,621 A | 10/1996 | Wooten | |
| 5,859,988 A | 1/1999 | Ajanovic | |
| 5,864,688 A | 1/1999 | Santos | |
| 6,047,349 A | 4/2000 | Klein | |
| 6,230,225 B1 | 5/2001 | Olarig | |
| 6,260,094 B1 | 7/2001 | Davis | |
| 6,336,158 B1 * | 1/2002 | Martwick | 710/104 |
| 6,742,074 B2 * | 5/2004 | Jeddeloh | 710/309 |
| 6,820,149 B2 * | 11/2004 | Moy | 710/104 |
| 7,099,966 B2 * | 8/2006 | Chan et al. | 710/100 |
| 2003/0188074 A1 * | 10/2003 | Bronson et al. | 710/306 |

OTHER PUBLICATIONS

Kay Annamalai, Multi-Ported PCI-to-PCI Bridge Chip, IEEE Meeting Date: Nov. 4, 1997-Nov. 6, 1997,WESCON/97. Conference Proceedings pp. 426-433.
Karl Wang et al., Designing the MPC105 PCI Bridge/Memory Controller IEEE Micro, Apr. 1995, vol. 15 Issue 2, pp. 44-49.
W.J. Bainbridge et al.,Asynchronous Macrocell Interconnect Using Marble, IEEE Meeting Date: Mar. 30, 1998-Apr. 2, 1998, pp. 122-132.
PCI Local Bus Specification, Rev. 2.2, Dec. 18, 1998, Chapters 1-3.
PCI-to-PCI Bridge Architecture Specification, Rev. 1.1, Dec. 18, 1998, Chapters 1-4.

* cited by examiner

*Primary Examiner*—Mark H. Rinehart
*Assistant Examiner*—Christopher Daley
(74) *Attorney, Agent, or Firm*—Molly McCall

(57) ABSTRACT

Disclosed are a system and method of forwarding bus transactions from a source device to a target device in multiple data bus environment. A bridge is coupled between a first data bus and a second data bus while a target device is coupled to the first data bus at a data bus address. A decoder may provide bus segment information to the bridge independently of a bus transaction on the second data bus initiated by a source device. The bridge may comprise logic to forward the bus transaction on the first data bus to the target device based upon the bus segment information.

18 Claims, 1 Drawing Sheet

BUS SEGMENT DECODER

CROSS REFERENCE TO RELATED APPLICATIONS

This application is a continuation of U.S. application Ser. No. 10/028,881, filed on Dec. 20, 2001 now U.S. Pat. No. 7,080,187 by inventor Richard P. Mackey, entitled "Bus Segment Decoder", and priority is claimed thereto.

BACKGROUND

1. Field

The subject matter disclosed herein relates to communication between devices coupled to data busses. In particular, the subject matter disclosed herein relates to addressing data bus transactions to target devices coupled to a data bus.

2. Information

Devices coupled to a data bus topology typically engage in data bus transactions whereby source device may initiate a bus transaction with a target device. The source device typically initiates a bus transaction with a particular target device by specifying a physical data bus address associated with the particular device. A data bus address is typically expressed in a fixed size field of bits according to a data bus protocol. Accordingly, the source device may address data bus transactions to a finite number of target devices coupled to a data bus topology.

BRIEF DESCRIPTION OF THE FIGURES

Non-limiting and non-exhaustive embodiments of the present invention will be described with reference to the following figures, wherein like reference numerals refer to like parts throughout the various figures unless otherwise specified.

DETAILED DESCRIPTION

Figure 1:
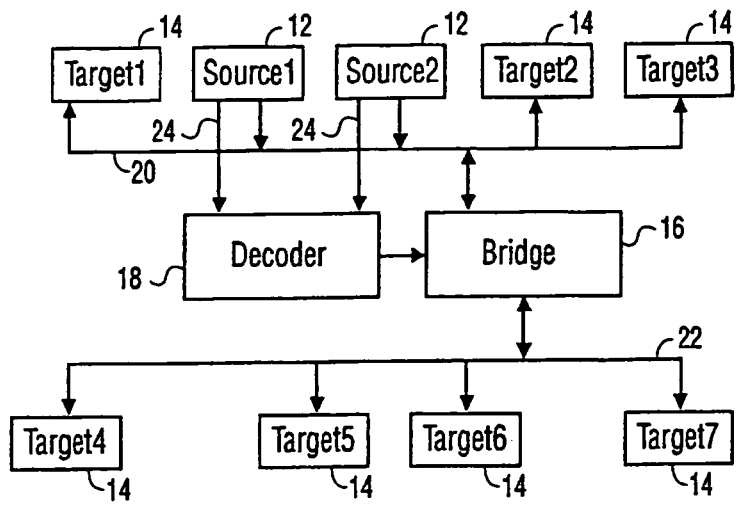
FIG. 1 shows a schematic diagram of a data bus topology according to an embodiment of the present invention.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

"Machine-readable" instructions as referred to herein relates to expressions which may be understood by one or more machines for performing one or more logical operations. For example, machine-readable instructions may comprise instructions which are interpretable by a processor compiler for executing one or more operations one or more data objects. However, this is merely an example of machine-readable instructions and embodiments of the present invention are not limited in this respect.

"Storage medium" as referred to herein relates to media capable of maintaining expressions which are perceivable by one or more machines. For example, a storage medium may comprise one or more storage devices for storing machine-readable instructions. However, this is merely an example of a storage medium and embodiments of the present invention are not limited in this respect.

"Logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Also, logic may comprise machine-executable instructions stored in a storage medium in combination with circuitry to execute such machine-executable instructions. However, these are merely examples of structures which may provide logic and embodiments of the present invention are not limited in this respect.

A "processing system" as discussed herein relates to a combination of hardware and software resources for accomplishing computational tasks. However, embodiments of the present invention are not limited in this respect. A "host processing system" relates to a processing system which may be adapted to communicate with a "peripheral device." For example, a peripheral device may provide inputs to or receive outputs from an application process hosted on the host processing system. However, these are merely examples of a processing system, peripheral device and host processing system, and embodiments of the present invention are not limited in these respects.

A "data bus" as referred to herein relates to circuitry for transmitting data between devices. For example, a data bus may transmit data between a host processing system and a peripheral device. However, this is merely an example and embodiments of the present invention are not limited in this respect. A "bus transaction" as referred to herein relates to an interaction between devices coupled in a bus structure wherein one device transmits data addressed to the other device through the bus structure.

A data bus may be coupled to a plurality of devices such that each coupled device is associated with a physical "data bus address." A bus transaction may then be addressed to individual devices coupled to the data bus according the data bus address associated with the device. However, this is merely an example of a data bus address and embodiments of the present invention are not limited in this respect.

A "source device" as referred to herein relates to a device which initiates a bus transaction on a data bus to transmit data. A source device may address a message in a bus transaction to a "target device" which is coupled to a data bus to receive bus transactions. However, these are merely examples of a source device and a target device, and embodiments of the present invention are not limited in these respects.

A "bridge" as referred to herein relates to circuitry or logic coupled between a data bus and one or more devices to enable transmission of data between the data bus and the devices. For example, a bridge may enable devices to communicate with a data bus according to a protocol native to the data bus. A bridge may be coupled between two data busses to enable a source device coupled to a first data bus to transmit data t a target device coupled to a second data bus. However, these are merely examples of a bridge and embodiments of the present invention are not limited in these respects.

A bridge may "forward" a bus transaction initiated on a first data bus to a device coupled to a second data bus. For example, a source device may initiate a bus transaction on a data bus having an address which is decoded and claimed by a bridge coupled to the data bus as a device. The bridge may then initiate a subsequent bus transaction on the second data bus to a target device coupled to the second data bus at a data bus address. However, this is merely an example of forwarding a bus transaction to a device and embodiments of the present invention are not limited in this respect.

A processing platform may comprise multiple data busses coupled by one or more bridges in a configuration that defines a plurality of "bus segments." Each bus segment in a processing platform may be associated with "bus segment information" to enable bus transactions to be addressed to devices coupled to the bus segment. However, these are merely examples of bus segments and bus segment information and embodiments of the present invention are not limited in this respect.

A "decoder" as referred to herein relates to logic to receive a signal from a source to provide information in a format. For example, a decoder may receive a signal from a source device upon initiation of a bus transaction and provide bus segment information to indicate a location of a target device in a processing platform with multiple bus segments. However, this is merely an example of a decoder and embodiments of the present invention are not limited in this respect.

Briefly, an embodiment of the present invention relates to a system and method of forwarding bus transactions from a source device to a target device in a multiple bus environment. A bridge may be coupled between a first data bus and a second data bus while a target device may be coupled to the first data bus at a data bus address. A decoder may provide bus segment information to the bridge independently of a bus transaction on the second data bus initiated by a source device. The bridge may comprise logic to forward the bus transaction on the first data bus to the target device based upon the bus segment information. However, this is merely an example embodiment and other embodiments of the present invention are not limited in these respects.

FIG. 1 shows a schematic diagram of a data bus topology according to an embodiment of the present invention. A first data bus 20 is coupled to a second data bus 22 by a bridge 16. The data busses 20 and 22 may comprise peripheral component interconnect (PCI) data bus structures formed according to the PCI Local Bus Specification, Rev. 2.2, Dec. 18, 1998, PCI Special Interest Group (hereinafter the "PCI Local Bus Specification"). A source device 12 may initiate data bus transactions on either of the data busses 20 or 22 addressed to a target device 14 according to a bus protocol. For example, a source device 12 may initiate a read or write bus transaction addressed to a target device 14 according to the PCI Local Bus Specification. However, these are merely examples of how a source device may address a data bus transaction to a target device according to a data bus protocol and embodiments of the present invention are not limited in these respects.

The bridge 16 may forward data bus transactions from a source device 12 coupled to a first data bus to a target device 14 coupled to a second data bus. For example, the bridge 16 may forward data bus transactions between the data busses 20 and 22 as described in the PCI-to-PCI Bridge Architecture Specification, Rev 1.1, Dec. 18, 1998, PCI Special Interest Group (hereinafter the "PCI-to-PCI Bridge Architecture Specification"). Here, the bridge 16 may claim all data bus transactions on a source data bus addressed to one data bus address or a range of data bus addresses on the source data bus. The bridge 16 may forward a claimed bus transaction to a target device on a destination data bus. For example, the bridge 16 may claim data bus transaction on a source data bus (for forwarding to a destination data bus) within a range of addresses defined by base and limit registers as described in Chapter 4 of the PCI-to-PCI Bridge Architecture Specification. However, this is merely an example of how a bridge may forward data bus transactions from a first data bus to a second data bus and embodiments of the present invention are not limited in this respect.

According to an embodiment, the bridge 16 may address a forwarded data bus transaction to a target device 14 on a destination data bus based upon an address of the forwarded transaction and bus segment information provided to the bridge 16 from a decoder 18. The decoder 18 may receive a signal from a source device 12 initiating the forwarded bus transaction on the source data bus independently of information transmitted in the bus transaction. The decoder 18 may comprise logic to decode the signal from the source device 12 to provide the bus segment information to the bridge 16. The bridge 16 may then comprise logic to generate an address for the forwarded bus transaction on the destination data bus.

According to an embodiment, the decoder 18 may comprise logic to generate bus segment information (to provide to the bridge 16) in response to signals transmitted from a source device 12 on a connection 24 independently of the data bus 20. In one embodiment, each connection 24 from a source device 12 may be associated with a bus segment coupled to a target device 14 on the data bus 22 such that the decoder 18 generates bus segment information of the associated bus segment in response to an assertion of the connection 24. Alternatively, source devices 12 may transmit an encoded signal identifying a particular bus segment being selected to receive a corresponding data bus transaction (to be forwarded by the bridge 16). However, these are merely examples of how a decoder may provide bus segment information to a bridge independently of a data bus and embodiments of the present invention are not limited these respects.

Figure 2:
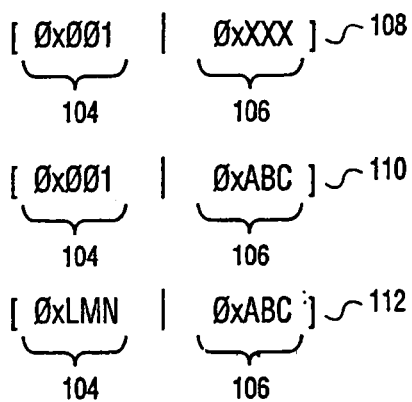
FIG. 2 shows representations of data bus addresses which may be used in a data bus transaction according to an embodiment of the data bus topology shown in FIG. 1.

FIG. 2 shows representations of addresses which may be used in a data bus transaction according to an embodiment of the data bus topology shown in FIG. 1. Each of the data bus addresses 108, 110 and 112 comprise a plurality of most significant bits (MSBs) 104 and a plurality of least significant bits (LSBs) 106. The data bus addresses may be representative of 32-bit or 64-bit addresses provided on Address and Data (AD) signals as described in Sections 3.2.2 and 3.9 of the PCI Local Bus Specification. However, this is merely an example of how a data bus address may be formatted for a data bus transaction and embodiments of the present invention are not limited in this respect.

In the illustrated embodiment, data bus address 108 represents a range of addresses on the data bus 20 which may be claimed by the bridge 16 for forwarding to the data bus 22. For example, the bridge 16 may claim each data bus transaction on the data bus 20 addressed with an address having the MSBs 104 of the data bus address 108, regardless of the value of the LSBs 106 of the data bus address of the transaction. For example, a source device 12 on the data bus 20 may initiate a data bus transaction on the data bus 20 having a data bus address 110 having MSBs 104 (e.g., "0x001") matching the MSBs 104 of the data bus address 104. Accordingly, the data bus address 110 is in the range of data bus addresses defined by the data bus address 108 such that the data bus transaction is claimed by the bridge 16 and forwarded to a device on the data bus 22. However, this is merely an example of how a bridge may claim data bus transactions on a first data bus for forwarding to a second data bus and embodiments of the present invention are not limited in this respect.

According to an embodiment, the bridge 16 may claim a bus transaction on the data bus 20 addressed according to the data bus address 110 and forward the claimed bus transaction to the data bus 22 addressed according to data bus address 112. The bridge 16 may comprise logic to format a data bus address for the forwarded data bus transaction based upon data in the LSBs 106 (e.g., "0xABC") of the data bus address 110 of the claimed data bus transaction and bus segment information received from the decoder 18. In the illustrated embodiment, for example, the bridge 16 may form the data bus address 112 (of the data bus transaction forwarded on the data bus 22) by copying the LSBs 106 of the data bus address 110 to the LSBs 106 of the data bus address 112, and providing the bus segment information (received from the decoder 18) to the MSBs 104 (e.g., "0xLMN") of the data bus address 112. The data bus 22 may then transmit the forwarded data bus transaction to a target device 14 according to the data bus address 112. However, this is merely an example of how a bridge may form a data bus address of a forwarded data bus transaction based upon decoded bus segment information and embodiments of the present invention are not limited in this respect.

According to an embodiment, bus segment information expressed in the MSBs 104 ("0xLMN") of the data bus address 112 (of the forwarded data bus transaction) may be associated with any one of a plurality of other bus segments (not shown) coupled to the data bus 22. Accordingly, the bus segment information expressed in the MSBs 104 of the data bus address 112 may address up to $2^N$ bus segments where N is the number of bits in MSBs 104 to receive bus segment information from the decoder 18. The LSBs 106 of the data bus address may then express the address of a particularly addressed device coupled to the bus segment expressed in the MSBs 104.

According to an embodiment, one or more of the target devices 14 coupled to the data bus 22 may forward a data bus transaction to additional data bus segments (not shown) through one or more additional bridges. The MSBs of the data bus address of a forwarded data bus transaction may address a particular data bus segment (not shown) coupled to the data bus 22 through a particular target device 14 coupled to the data bus 22. For example, the particular target device 14 may comprise a bridge coupled between the data bus 22 and the particular bus segment. This bridge may claim bus transactions having a data bus address within range of addresses defined in any portion of the MSBs 104 of the data bus address 112.

Figure 3:
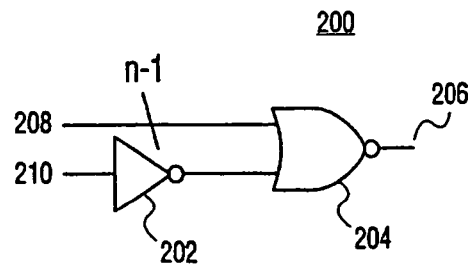
FIG. 3 shows a schematic diagram of logic to detect data bus addresses of bus transactions to be forwarded according to an embodiment of the data bus topology shown in FIG. 1.

FIG. 3 shows a schematic diagram of logic 200 to detect data bus addresses of bus transactions to be forwarded according to an embodiment of the data bus topology shown in FIG. 1. In an embodiment in which a single bit "1" is used in a data bus address to indicate a bus transaction that is to be forwarded (e.g., as indicated in the MSBs 104 of data bus addresses 108 and 110), the bridge 16 may comprise logic to detect data bus addresses within the range of data bus addresses (for forwarding transactions from data bus 20 to data bus 22) using an inverter 202 and an n-bit NOR gate array 204 where n is the number bits in the MSBs of the data bus address (e.g., MSBs 104). An input 210 receives the lowest bit of the MSBs of the data bus address while an input 208 receives the remaining upper n−1 bits. An output 206 of the NOR gate 204 indicates data bus addresses of transactions to be forwarded. However, this is merely an example of how a bridge may detect data bus transactions on a first data bus to be forwarded to a second data bus and embodiments of the present invention are not limited in this respect.

While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A system comprising:
    a bridge located between a first data bus and a second data bus; and
    a decoder to provide bus segment information to the bridge independently of response to a bus transaction on the second data bus initiated by a source device;
    wherein the source device to transmit an encoded signal via a connection to the decoder, wherein the connection is associated with a bus segment coupled to the target device and wherein the connection is independent of the first data bus where the target device is coupled, wherein the encoded signal to identify a bus segment being selected to receive a bus transaction, and wherein the decoder generates the bus segment information of the associated bus segment in response to an assertion of the connection and based on the encoded signal.

2. The system of claim 1, wherein the bridge further comprises:
    logic to forward bus transactions on the first data bus to the second data bus, each forwarded bus transaction being addressed to a range of data bus addresses on the first data bus; and
    logic to combine bus segment information from the decoder with a portion of a data bus address in the range of data bus addresses to provide a data bus address for a bus transaction forwarded to the first data bus.

3. The system of claim 2, wherein the bus segment information comprises a first portion of the data bus address of the target device.

4. The system of claim 2, wherein each data bus address comprises a plurality of most significant bits and a plurality of least significant bits, and wherein the bridge further comprises logic to combine the least significant bits of the address with bus segment information to provide the data bus address of the target device on the first data bus.

5. The system of claim 2, wherein each data bus address comprises a plurality of most significant bits, and wherein the bridge further comprises logic to detect a data bus transaction to be forwarded to the second data bus based upon a single value expressed in the most significant bits.

6. The system of claim 1, wherein the system further comprises one or more source devices to initiate bus transaction on the second data bus having data bus addresses within the range of data bus address, and wherein each source device is coupled to the decoder to provide bus segment information in response to initiating a bus transaction on the second data bus having a data bus address within the range of data bus addresses.

7. A method comprising:
   generating bus segment information of a bus segment coupled to a target device in response to an assertion of a connection associated with the bus segment coupled to the target device, wherein the connection is independent of a first data bus where the target device is coupled, wherein the bus segment information to be generated from an encoded signal transmitted via a connection from a source device to a decoder, wherein the encoded signal to identify a bus segment being selected to receive a bus transaction, and wherein the decoder generates the bus segment information of the associated bus segment in response to an assertion of the connection and based on the encoded signal.

8. The method of claim 7, the method further comprising:
   providing the bus segment information to the bridge in response to the bus transaction independently of a second data bus coupled to the source device;
   forwarding bus transactions on the second data bus to the first data bus, each forwarded bus transaction being addressed to a range of data bus addresses on the second data bus; and
   combining the bus segment information with a portion of a data bus address in the range of data bus addresses to provide a data bus address for a bus transaction forwarded to the first data bus.

9. The method of claim 8, wherein the bus segment information comprises a first portion of the data bus address of the target device.

10. The method of claim 8, wherein each address in the range of address comprises a plurality of most significant bits and a plurality of least significant bits, and wherein the method further comprises combining the least significant bits of the address with bus segment information to provide the data bus address of the target device on the first data bus.

11. The method of claim 8, wherein each data bus address comprises a plurality of most significant bits, and wherein the method further comprises detecting a data bus transaction to be forwarded to the second data bus based upon a single value expressed in the most significant bits.

12. The method of claim 7, wherein the method further comprises one or more source devices to initiate bus transaction on the second data bus having data bus addresses within the range of data bus address, and wherein each source device is coupled to the decoder to provide bus segment information in response to initiating a bus transaction on the second data bus having a data bus address within the range of data bus addresses.

13. An apparatus comprising:
   means for generating bus segment information of a bus segment coupled to a target device in response to an assertion of a connection associated with the bus segment coupled to the target device, wherein the connection is independent of a first data bus where the target device is coupled, wherein the bus segment information to be generated from an encoded signal transmitted via a connection from a source device to a decoder, wherein the encoded signal to identify a bus segment being selected to receive a bus transaction, and wherein the decoder generates the bus segment information of the associated bus segment in response to an assertion of the connection and based on the encoded signal.

14. The apparatus of claim 13, the apparatus further comprising:
   means for providing the bus segment information to the bridge in response to the bus transaction independently of the second data bus;
   means for forwarding the bus transaction to the target device on the first data bus based upon the bus segment information;
   means for forwarding bus transactions on the second data bus to the first data bus, each forwarded bus transaction being addressed to a range of data bus addresses on the second data bus; and
   means for combining the bus segment information with a portion of a data bus address in the range of data bus addresses to provide a data bus address for a bus transaction forwarded to the first data bus.

15. The apparatus of claim 14, wherein the bus segment information comprises a first portion of the data bus address of the target device.

16. The apparatus of claim 14, wherein each address in the range of address comprises a plurality of most significant bits and a plurality of least significant bits, and wherein the apparatus further means for comprises combining the least significant bits of the address with bus segment information to provide the data bus address of the target device on the first data bus.

17. The apparatus of claim 14, wherein each data bus address comprises a plurality of most significant bits, and wherein the apparatus further comprises means for detecting a data bus transaction to be forwarded to the second data bus based upon a single value expressed in the most significant bits.

18. The apparatus of claim 14, wherein the apparatus further comprises one or more source devices to initiate bus transaction on the second data bus having data bus addresses within the range of data bus address, and wherein each source device is coupled to the decoder to provide bus segment information in response to initiating a bus transaction on the second data bus having a data bus address within the range of data bus addresses.

* * * * *